Patented Jan. 24, 1950

2,495,458

UNITED STATES PATENT OFFICE 2,495,458

INTERPOLYMER PRODUCED FROM POLYHYDRIC ALCOHOL, POLYBASIC ACID, AND INTERPOLYMER OF VINYLAROMATIC COMPOUND WITH DRYING OIL OR ACID

Eugene W. Kanning, Edward G. Bobalek, and Edward G. Hart, Cleveland, Ohio, assignors to The Arco Company, Cleveland, Ohio, a corporation of Ohio No Drawing. Application June 2, 1947, Serial No. 751,960

10 Claims. (Cl. 260—45.4)

1

The present invention relates to a novel type of resinous polymer, and is more particularly concerned with the product of the reaction of (1) an interpolymer of a monovinylaromatic compound with an at least partially conjugated drying oil fatty acid or ester, (2) a polyhydric alcohol, and (3) a polybasic acid. The invention is further concerned with a process whereby the novel type of polymeric material is prepared, and with surface coatings and films produced therefrom.

It has previously been proposed to incorporate styrene into a surface-coating according to various procedures. Such methods have, for example, included the polymerization of styrene in the presence of a drying oil, a resin, or a cellulosic film-forming material (U. S. Patent 1,975,595). Other methods of incorporating styrene compound into a surface coating have also been suggested, and these previous methods have, in certain instances, been productive of a product having at least some advantages over ordinary types of surface coatings. However, it has not been suggested to prepare a polymeric material of the type with which the present invention is concerned.

The resinous product of the present invention is formed by the interpolymerization of three starting materials. These are, first, a non-gelled polymer of a monomeric monovinylaromatic compound with an at least partially conjugated drying oil or oil fatty acid of specific characteristics, in which polymer the monovinylaromatic compound is present, in polymeric form, in amount between about 18 and 50 per cent by weight, the balance, being drying oil or oil fatty acid. The second reactant is a polyhydric alcohol containing at least three hydroxyl groups per molecule, and the third reactant is a polybasic acid. The monovinylaromatic compound and the at least partially conjugated drying oil or oil fatty acid are first polymerized together to a point short of gelation, until the monovinylaromatic compound is present in the interpolymer in polymeric form in amount between about 18 and 50 per cent by weight of the polymer. This product is then reacted with the polyhydric alcohol and the polybasic acid, either in the order stated or with the polyhydric alcohol and polybasic acid simultaneously or in admixture. The interpolymer of the monovinylaromatic compound and the drying oil or acid comprises from about 30 to about 80 per cent by weight of the starting reactants and consequently also of the final resinous polymer.

The polymer of the invention has been found to be an exceptionally desirable constituent in surface-coatings, as films produced therefrom are glossy, exceedingly tough, and very adhesive to metal surfaces, whether in the form of a paint or varnish. Films formed from the said polymer exhibit excellent resistance to water, alkali, and general exposure, and also possess the desirable characteristic of a rapid air-drying time which is comparable to the drying speed of a plasticized nitrocellulose lacquer. The product is soluble in the usually employed types of varnish and paint solvents, showing excellent color and clarity when in solutions thereof. A preferred application of the polymer of the present invention is in the production of baking or air-drying enamels.

By "monovinylaromatic compound," as employed in this specification is meant a compound containing at least a phenyl or naphthyl radical in combination with a vinyl group, and otherwise structurally similar to styrene. The phenyl group may contain substituents, as, for example, fluorine, chlorine, methoxy, hydroxy, methyl, trichloromethyl, or trifluoromethyl. As representative compounds included within the scope of "monovinylaromatic compound" may be mentioned styrene itself, para-methylstyrene, para-chlorostyrene, para-fluorostyrene, meta-chlorostyrene, meta-fluorostyrene, meta- and para-trichloromethylstyrene, meta- and para-trifluoromethylstyrene, ortho- and meta-hydroxystyrene, methoxystyrenes, vinylnaphthalene, and the like. Substituents may also be present on the vinyl group, as in alpha-methylstyrene, but of course not in a manner such as to retard polymerization. Especially preferred monovinylaromatic compounds are the styrene derivatives, and particularly styrene itself, alpha-methylstyrene, and fluorostyrenes.

The at least partially conjugated drying oil fatty acid or ester, may be any one of the at least partially conjugated drying oils, which usually exist chiefly as the glycerides of certain complex unsaturated straight-chain organic acids, the oil fatty acids themselves, or synthetic esters of the drying oil fatty acids. The conjugated drying oil or acid, to be operative in the method of the present invention, should have an average double bond content and degree of conjugation, as determined by average iodine number and diene number, the former being the experimental measure of unsaturation and the latter being the experimental measure of conjugated unsaturation, according to specifications published by J. D. von Mikusch and Charles Frazier, Ind. Eng. Chem., Anal. Ed. 13, 782–789 (1941); 15, 109–113 (1943), at least as great as that of dehydrated castor oil (a minimum of approximately 133 and 33 Woburn) and not in excess of that for beta-eleostearic acid (approximately 274 and 91 Woburn). As ordinarily obtained from commercial sources, the drying oils consist chiefly of glycerides of the drying oil fatty acids, which acids may be liberated from the oils by saponification and acidulation of separated acid salts. The oil acids thus obtained may, if desired, be esterified with monohydric or polyhydric alcohols according to usual esterification procedures. These esters are usually referred to as synthetic drying oil esters, and are similar to the natural oil in many respects. Either the oil, the oil derived acids, or synthetic esters may be employed in the method of the present invention. Ordinarily, these natural fatty acid glyceride esters, the natural drying oil fatty acids, or various synthetic esters of the same, are processed by commercial suppliers according to various procedures which effect an average double bond content and degree of conjugation such as to render the processed oils or acids suitable for employment in the present invention. The procedure when the oil fatty acids are employed is somewhat more facile than when the esters are employed, inasmuch as the tendency toward gelation is considerably less. Mixtures of drying oils, or of oils with acids, may also be employed, but, whether in the pure or mixed state, the requirement for conjugation remains the same. Drying oils and acids having a greater or lesser average double bond content than that prescribed above are unsuited for use, and, if the necessary conjugation is not present in the oil or acid as introduced into the reaction zone, then heating or other reaction conditions must be sufficient to produce the same therein. As representative drying oils and acids which may be employed, for example, are dehydrated castor oil, conjugated linseed oil fatty acids, isomerized walnut oil, conjugated soya oil, and blends of these conjugated oils and acids with oils such as soya and linseed.

The first step in carrying out the method of the present invention, i.e., the preparation of the drying oil and/or acid and monovinylaromatic compound polymerization product, essentially comprises the admixture of from 30 to 70 per cent by weight of the monovinylaromatic compound and from 70 to 30 per cent by weight of the conjugated drying oil and/or acid, preferably in the presence of an addition polymerization catalyst such as benzoyl peroxide, ditertiarybutyl peroxide, or oxygen. The mixture is then heated together at a polymerization temperature between about 100 and 180 degrees centigrade, preferably at 130 to 160 degrees centigrade, for a period of time sufficient effectively to convert at least about 60 per cent, and preferably between about 60 and 80 per cent, of the monomeric monovinylaromatic compound to polymeric material. This usually demands a period of from about two hours to eight hours at the preferred temperatures given.

The effective conversion of monomer to polymeric material may be determined by standard volatility procedure, the per cent of monomeric monovinylaromatic compound being retained after a specific period, e. g., one to two hours, at a specific temperature, e. g., 150 degrees centigrade, being indicative of the proportion in polymeric form. The monovinylaromatic compound in polymeric form may be present as its polymer or as a copolymer thereof with the drying oil and/or acid, but may be considered merely as an interpolymer with the drying oil fatty acid and/or ester.

The conversion of from 60 to 80 per cent of the monovinylaromatic compound in a particular starting mixture of reactants, containing from 30 to 70 per cent by weight thereof, is readily productive of a non-gelled resinous interpolymer containing from about 18 to 50 per cent by weight of polymeric monovinylaromatic compound in one form of polymer or another. However, in every instance, it is necessary that this polymer of the monovinylaromatic compound and drying oil and/or acid be maintained in the non-gelled state, and, therefore, the polymerization must always be checked short of this point. This means that, for example, if the monovinylaromatic compound and a drying oil are polymerizable only to a composition containing 18 per cent by weight of the monovinylaromatic compound without the onset of gelation, then this is as far as the polymerization should be conducted. On the other hand, with some drying oil fatty acids, it is entirely possible to obtain a polymeric material containing as high as 50 per cent by weight of the monovinylaromatic compound in polymeric form, and the most advantageous percentage of monovinylaromatic compound in such an interpolymer is between about 30 and about 50 per cent. A polymer containing from 30 to 40 per cent of monovinylaromatic compound may be prepared readily from 50-50 weight mixtures of the monovinylaromatic compound and a conjugated oil fatty acid having the requisite characteristics of unsaturation. However, it is to be understood that, in any instance, gelation of the monovinylaromatic compound and drying oil reaction product is to be avoided, and that the polymerization should be continued to a percentage of monovinylaromatic compound in the polymer between about 18 and 50 per cent by weight, the upper limit of which will necessarily be determined by the minimum percentage at which gelation occurs. However, this is not a consideration as to the product of the present invention, as any non-gelled interpolymer of a monovinylaromatic compound and a drying oil or fatty acid is suitable for employment in the process, whether it contain 18 per cent or 50 per cent by weight of polymeric monovinylaromatic compound, although, as previously stated, a composition containing in excess of 30 per cent of the monovinylaromatic compound in polymeric form is preferred.

While the time required for the effective conversion of the desired amount of monovinylaromatic compound to polymeric material is usually between about two and about eight hours when a temperature of 130-160 degrees centigrade is employed, reduction of the temperature to about 100 degrees centigrade usually correspondingly increases the reaction period to about ten to twelve hours. The reaction is ordinarily continued until attainment of a reaction product having a viscosity in excess of about K on the Gardner-Holdt scale at a temperature of 77 degrees Fahrenheit, but always to an extent short of the point at which gelation occurs.

The presence of a solvent for the reactants is not required during the first step in the process, and such is preferably not employed, inasmuch as to carry out the subsequent esterification reactions in a fusion manner would require elimination of the solvent before proceeding into the esterification reactions. Otherwise, if a solvent is used and allowed to remain, these esterifications must be conducted according to the here less desirable solvent process. However, if desired, solvents such as xylene, toluene, turpentine, terpenes, and other hydrocarbons may be employed during the polymerization of monovinylaromatic compound with the drying oil and/or acid, with mineral spirits (petroleum hydrocarbons having a boiling range between about 150 and 200 degrees centigrade), or compounds of higher solvency, being preferred.

As polyhydric alcohols which may be utilized in the method of the invention may be employed, for example, glycerol, pentaerythritol, polyallyl alcohol, mannitol, sorbitol, erythritol, trimethylol propane, and similar other alcohols containing at least three hydroxyl groups, inasmuch as this property allows for greater cross-linkage possibilities. The amount of polyhydric alcohol employed is always in excess of that amount theoretically necessary to neutralize all carboxyl groups in the reaction, usually between about 5 and about 20 per cent by weight of the starting reactants, and is ordinarily such as to allow a ratio of hydroxyl groups to carboxyl groups in the reactants between about 1.1 and 2.0 to 1, and preferably between about 1.1 and 1.6 to 1.

The polyhydric alcohol and polybasic acid may be reacted with the primary interpolymer in any suitable manner according to conventional resin-forming procedure. Thus the alcohol may be added first and then the polybasic acid, or both may be added at the same time in admixture or separately. However, certain advantages accrue to the use of specific procedure when operating with different types of constituents, and therefore, when less than about two-thirds of the non-monovinylaromatic compound portion of the basic interpolymer consists of oil fatty acids, it is advantageous to heat the polyhydric alcohol and the primary interpolymer together for a short time, e. g., one-half to three hours, at a preferred temperature, e. g., 235 degrees centigrade, before addition of the polybasic acid. However, when the non-monovinylaromatic compound portion of the basic interpolymer consists of more than about two-thirds oil fatty acids, no advantage is ordinarily gained by employment of such procedure, and the polyhydric alcohol and polybasic acid are usually introduced into the reaction at the same time.

The reaction of the basic interpolymer with the excess of polyhydric alcohol, in the absence of polybasic acid, may be accomplished advantageously by heating the reactants together at the temperature sufficient to promote alcoholysis. This is usually in the presence of a catalyst, such as litharge or calcium stearate, and at a temperature between about 130 and 250 degrees centigrade, preferably at a temperature between about 200 and 240 degrees centigrade. This alcoholysis usually demands from about one-half to four hours at the preferred temperatures given.

As the polybasic acid of the present invention may be employed any polybasic acid or the anhydride thereof, such as the dibasic acids malonic, succinic, glutaric, adipic, sebacic, methylmalonic, maleic, itaconic, perfluoroglutaric, perfluoroadipic, and phthalic; tribasic acids such as 1,2,4-butane-tricarboxylic acid, and the like. At least a portion of a polybasic acid must always be introduced, and, for the production of the most desirable product, sufficient of the polybasic acid should be added to render the ratio of hydroxyl groups to carboxyl groups between about 1.1 and 2.0 to 1, and preferably between about 1.1 and 1.6 to 1. This ratio allows the polybasic acid to react with the excess of polyhydric alcohol, and thereby effects considerable cross linkage.

The procedure employed for the step in which the polybasic acid is introduced into the reaction mixture after addition of the polyhydric alcohol involves maintenance of the temperature at a desired resin-forming level, e. g., 130-290 degrees centigrade, usually between about 210 and 290 degrees centigrade, preferably between about 230 and 250 degrees centigrade. The temperature may then be elevated rapidly, usually within about two hours from the time of addition, until drops of the resin, when cooled on glass, are clear. Prior to this state, a chilled drop of the reaction mixture is quite cloudy and has a waxy texture, indicating incompatability of the resinous components. Likewise, films cast from the material prior to the high temperature thermal treatment have inferior characteristics.

Instead of raising the temperature rapidly, the reaction mixture may be maintained at any resin-forming temperature, usually within the range of about 210 to 290 degrees centigrade, until clarity is observed in the cooled resin, and, if this procedure is employed, the temperature is advantageously maintained above about 230 degrees centigrade. However, the procedure wherein the temperature is raised rapidly is considered somewhat more desirable.

If the polyhydric alcohol and polybasic acid are reacted with the basic interpolymer at the same time, as is usually the practice when drying oil fatty acids make up at least about two-thirds of the non-monovinylaromatic compound portion of the primary interpolymer, the reaction mixture may be maintained at a resin-forming temperature of 210-290 degrees centigrade, usually above about 230 degrees centigrade, until cooled drops of the resin are clear. The temperature is, however, also in this case preferably elevated rapidly until compatibility is noted, usually within less than about two hours after addition. According to any procedure followed during the esterification part of the process, it is always advantageous to employ blowing of an inert gas, e. g., nitrogen or carbon dioxide, through the reaction mixture to assist in the removal of water therefrom. The reaction is continued in all cases until attainment of the desired clarity, and a resin-forming temperature e. g., 210-290 degress centigrade, may be maintained until the acid value of the resin is less than 30, and preferably less than about 10. The reaction may then be checked at any desirable extent prior to gelation, conveniently by diluting the resin to a solution of about 60 per cent non-volatile solids with a petroleum hydrocarbon having a boiling point within the range 150 to 200 degrees centigrade, or other suitable solvent.

If desired, solvents such as toluene, xylene, dipentene, or moderately low-boiling aliphatic hydrocarbons may also be incorporated into the esterification mixture, and the reaction conducted under temperature conditions regulated according to the maximum volume of reflux which can be controlled in the particular apparatus employed. The reaction container, may, for example, be provided with a reflux condenser having a receiver whereby the mixed solvent-water condensate is collected and whereby the separated water may be withdrawn while the solvent is returned to the reaction container at a rate sufficient to replace the quantity removed by distillation. In such operation, carbon dioxide or other inert gas is not used, except perhaps as a protective blanket to inhibit oxidation. The fusion process first given is, however, preferred, inasmuch as the process is usually conducted in a unitary manner, with no solvent whatever being employed. However, as previously stated, a solvent may be used during polymerization of the monovinylaromatic compound and the drying oil or acid, likewise for the alcoholysis procedure where such is necessary, and during the esterfication procedure, though products produced by a solvent process are not generally possessive of such desirable characteristics as those produced by the fusion method.

The resinous polymer of the present invention is thus produced from (a) about 30 to 80 percent of non-gelled interpolymer of a monovinylaromatic compound with an at least partially conjugated drying oil or oil fatty acid, said monovinylaromatic compound being present in polymeric form in amount between about 18 to 50 per cent by weight of the interpolymer, (b) a polyhydric alcohol, and (c) a polybasic acid. The primary interpolymer (a) preferably comprises from about 50 to about 80 per cent by weight of the starting reactants. The monovinylaromatic compound and drying oil reaction product preferably contains in excess of 30 per cent polymeric monovinylaromatic compound. The polyhydric alcohol is in excess of that amount required to neutralize any acids in the reaction components, and is usually about five to twenty per cent by weight of the reactance. At least a portion of a polybasic acid is always introduced into the reaction mixture, and such is preferably present in an amount sufficient to render the ratio of hydroxyl groups to carboxyl groups in the reactants between about 1.1 and 2.0 to 1.

As before stated, the resinous polymer of the present invention is particularly adapted to employment in surface-coating compositions, and exhibits exceptional characteristics of resistance, adhesion, and an exceedingly rapid drying time. Films produced from this reaction product are glossy and exceedingly tough, whether in paint or varnish form. No cloudiness is shown in common solvents to indicate incompatability of any components, and the polymeric material is especially suited for employment in baking or air-drying enamels.

The following examples are given to illustrate the process of the present invention, but are not to be construed as limiting.

*Example 1*

Two hundred and fifty grams of styrene, 225 grams of conjugated linseed oil fatty acids having the following specifications:

1. Iodine No., 143–153 (WIJS), 178–187 (Woburn)
2. Color, 1–2
3. Acid No., 197.5 to 199
4. Saponification No., 198.5 to 199.5
5. Ester value, 0–1.5
6. Hexabromide value, 0–3
7. WIJS on ice for 3 minutes, iodine value, 115–120
8. Conjugation (by difference), 60–65, (62–73 Woburn)
9. Titre value, 18–24
10. Spec. gravity, 0.9201 at 25° C.
11. Viscosity, A+ to F (Gardner-Holdt scale at 77° F.)

and six grams of ditertiarybutyl peroxide were heated together for a period of about six hours at a temperature between about 150 and 155 degrees centigrade in a three-neck, one-liter flask provided with mechanical stirrer, reflux condenser, and thermometer. At the end of this time, the reflux condenser was removed and sixty grams of glycerol, 0.3 gram of litharge, and 60 grams of phthalic anhydride were added thereto. While a slow stream of carbon dioxide was blown through the mixture, the temperature was elevated to 250–255 degrees centigrade and held at this level until a drop of the reaction product, when chilled on glass, gave a gummy consistency and clear appearance, indicating compatibility of the resinous components. The temperature was then reduced to 215–225 degrees centigrade, held at this temperature until the acid value was below 25, and the reaction checked prior to gelation by dilution of the resin to a solution of 60 per cent non-volatile solids with a petroleum hydrocarbon solvent having a boiling point in the range 150–200 degrees centigrade.

Films produced from the polymer exhibited exceptional gloss, toughness, adhesion, and general exposure resistance, as well as an air-drying time comparable to that of a lacquer.

*Example 2*

Two hundred and fifty grams of styrene, 300 grams of linseed oil, 100 grams of tung oil, and three grams of ditertiarybutyl peroxide were heated together at a temperature of 150 to 155 degrees centigrade in the same apparatus as described in the preceding example. When the reaction mixture had attained a viscosity of L–P (Gardner-Holdt scale at 77 degrees Fahrenheit), the reflux condenser was removed and the temperature elevated gradually over a period of two hours to between about 215–220 degrees centigrade, while a current of carbon dioxide was blown through the reaction mixture.

Fifty grams of glycerol and 0.3 gram of litharge were then added to 382 grams of the above reaction product, and the temperature elevated to between 230–235 degrees centigrade and maintained at this level under reflux for 30 minutes. Heating at this temperature was continued for an additional 30 minutes after the reflux condenser had been removed and while a slow current of carbon dioxide was blown through the mixture. Ninety-five grams of phthalic anhydride was then added, and, while carbon dioxide was continuously bubbled through the mixture, the temperature was elevated to between about 240 and 250 degrees centigrade and maintained at this level until the acid value of the reaction product was less than five. The resin was then cooled to a temperature below about 215 degrees centigrade, and the reaction checked prior to gelation by dilution to a solution of sixty per cent non-volatile solids with a petroleum hydrocarbon solvent having a boiling point in the range between 150 and 200 degrees centigrade.

Films produced from the resinous product exhibited the same desirable characteristics as given for the product of Example 1.

*Example 3*

The procedure of Example 1 is repeated, using instead of the styrene, 250 grams of alpha-methylstyrene. The resinous product obtained thereby has characteristics very similar in quality to that produced from styrene itself and exhibits excellent surface-coating characteristics.

*Example 4*

The procedure of Example 1 is repeated using instead of the styrene 275 grams of para-fluorostyrene. The resinous interpolymer produced therefrom exhibits characteristics similar to that produced from styrene itself, and in addition appears to have superior durability and toughness.

Example 5

The procedure of Example 1 was repeated, using 225 grams of conjugated linseed oil fatty acids, 250 grams of styrene, 80 grams of pentaerythritol and 55 grams of adipic acid. The resinous product was similar to that of Example 1, and showed excellent surface-coating quality.

Coating compositions prepared from the polymer of the present invention and a number of driers, pigments, and resins are especially suitable for employment as varnishes and baking enamels, inasmuch as films formed therefrom exhibit excellent toughness, durability, and resistance to alkali, water, and general atmospheric exposure. Driers which may be advantageously incorporated with the interpolymer are metallic napthenates, such as cobalt, manganese and lead. As pigments that may be incorporated in the said coatings may be mentioned zinc oxide, titanium dioxide, and iron blue. Among the resins which may be advantageously employed in combination with the interpolymer of the present invention to allow production of a surface coating having specifically modified properties, hydrocarbon-soluble phenol-aldehyde resins, melamine or urea resins, pentaerythritol esters of rosin, ester gum, and, in general, varnishes prepared from drying oils and the common hard varnish resins are desirable. Such resins or varnishes are preferably employed in minor proportions, e. g., in amounts no greater than 30 per cent by weight of the mixture.

For the preparation of surface coatings from the interpolymer of the present invention, the resin may be diluted to any desirable extent with common varnish solvents, mineral spirits and xylene being somewhat preferred. The concentration should usually be between about 50 and 60 per cent of non-volatile solids, and films produced from such solutions have been found especially desirable. The exact concentration employed, however, is not significant, as it has been found that variation of the solids content over a reasonable range does not materially affect the superior quality of the films.

Various modifications may be made in the invention without departing from the spirit or scope thereof, and it is to be understood that we limit ourselves only as defined in the appended claims.

We claim:

1. A non-gelled resinous interpolymer formed about 30 to 80 percent by weight of (a) a non-gelled interpolymer of a monovinylaromatic compound selected from the group consisting of styrene, vinylnaphthalene, fluorostyrene, chlorostyrene, methoxystyrene, hydroxystyrene, methylstyrene, trichloromethylstyrene, trifluoromethylstyrene, and alpha-methylstyrene with a compound selected from the group consisting of drying oils and drying oil fatty acids having a Woburn iodine number between about 133 and 274 and a Woburn diene number between about 33 and 91, said monovinylaromatic compound in polymeric form comprising from about 18 to 50 percent by weight of said interpolymer (a), the remainder being (b) a polyhydric alcohol containing as sole functional groups at least three and not more than six hydroxyl groups per molecule, and (c) a polybasic organic acid selected from the group consisting of saturated and unsaturated polybasic acids containing carboxyl groups as sole functional groups, the relative proportions of (b) and (c) being such as to render the ratio of hydroxyl groups to carboxyl groups in the starting reactants between about 1.1 and 2.0 to 1, the said interpolymer having an acid number below 30.

2. The product of claim 1, wherein the monovinylaromatic compound is styrene.

3. The product of claim 1, wherein the amount of (a) in the polymeric product is between 50 and 80 per cent by weight.

4. The product of claim 1, wherein the amount of monovinylaromatic compound in the primary interpolymer (a) is above 30 per cent.

5. The process for the production of a resinous interpolymer which includes the step of reacting together, at a resin-forming temperature between about 130 and 290 degrees centigrade, from about 30 to 80 percent by weight of (a) a non-gelled interpolymer of a monovinylaromatic compound selected from the group consisting of styrene, vinylnaphthalene, fluorostyrene, chlorostyrene, methoxystyrene, hydroxystyrene, methylstyrene, trichloromethylstyrene, trifluoromethylstyrene, and alphamethylstyrene, with a compound selected from the group consisting of drying oils and drying oil fatty acids having a Woburn iodine number between about 133 and 274 and a Woburn diene number between about 33 and 91, said monovinylaromatic compound in polymeric form comprising from about 18 to 50 percent by weight of said interpolymer (a), the remainder being (b) a polyhydric alcohol containing as sole functional groups at least three and not more than six hydroxyl groups per molecule, and (c) a polybasic organic acid selected from the group consisting of saturated and unsaturated polybasic acids containing carboxyl groups as sole functional groups, the relative proportions of (b) and (c) being such as to render the ratio of hydroxyl groups to carboxyl groups in the starting reactants between about 1.1 and 2.0 to 1, until an acid number of less than about 30 has been attained in the resin.

6. The process of claim 5, wherein the amount of monovinylaromatic compound in the primary interpolymer (a) is above about 30 per cent.

7. The process of claim 5, wherein the amount of (a) in the polymeric product is between 50 and 80 per cent by weight.

8. The process of claim 5, wherein the monovinylaromatic compound is styrene.

9. The process of claim 5, wherein the polyhydric alcohol (b) is heated together with the primary interpolymer (a) before addition of the polybasic acid (c).

10. The process of claim 9, wherein the polyhydric alcohol (b) and primary interpolymer (a) are heated together at a temperature between 130 and 250 degrees centigrade, and wherein the reaction is maintained at a temperature between 210 and 290 degrees centigrade after addition of polybasic acid (c).

EUGENE W. KANNING.
EDWARD G. BOBALEK.
EDWARD G. HART.

REFERENCES CITED

The following references are of record in the file of this patent:

UNITED STATES PATENTS

| Number | Name | Date |
|---|---|---|
| 2,392,710 | Wakeford et al. | Jan. 8, 1946 |